US008429308B2

(12) United States Patent
Pappu et al.

(10) Patent No.: US 8,429,308 B2
(45) Date of Patent: Apr. 23, 2013

(54) SYSTEM AND METHOD FOR MIGRATING DATA FROM A STORAGE DEVICE

(75) Inventors: Shivesh Kumar Pappu, Bihar (IN); Santosh Kumar Gupta, Uttar Pradesh (IN); Laural S. Gentry, Berkshire (GB); Nishant S. Thorat, Maharashtra (IN); Arvind Raghavendran, Andhra Pradesh (IN)

(73) Assignee: CA, Inc., Islandia, NY (US)

( * ) Notice: Subject to any disclaimer, the term of this patent is extended or adjusted under 35 U.S.C. 154(b) by 341 days.

(21) Appl. No.: 12/362,205

(22) Filed: Jan. 29, 2009

(65) Prior Publication Data

US 2010/0191868 A1     Jul. 29, 2010

(51) Int. Cl.
*G06F 3/00* (2006.01)
*G06F 13/00* (2006.01)

(52) U.S. Cl.
USPC .................................................. 710/8; 710/33

(58) Field of Classification Search ............. None
See application file for complete search history.

(56) References Cited

U.S. PATENT DOCUMENTS

| 6,446,141 | B1* | 9/2002 | Nolan et al. ............... 710/8 |
| 2006/0075217 | A1* | 4/2006 | Takamoto et al. ........... 713/2 |
| 2006/0193463 | A1* | 8/2006 | Graf ...................... 379/269 |
| 2007/0294703 | A1* | 12/2007 | Talu et al. .............. 719/310 |
| 2009/0271579 | A1* | 10/2009 | Ogawa .................... 711/159 |
| 2009/0276594 | A1* | 11/2009 | Fujii et al. ............. 711/162 |

* cited by examiner

*Primary Examiner* — Kris Rhu
(74) *Attorney, Agent, or Firm* — Baker Botts, L.L.P.

(57) ABSTRACT

According to one embodiment of the present disclosure, a method for migrating data from a storage device includes accessing data on a storage device. The method also includes providing at least one interface that allows for selecting a first operating system stored on the storage device. The interface further allows for selecting one or more settings stored on the storage device. The method further includes initiating a migration of the one or more settings from the storage device. The method further includes storing the one or more settings.

21 Claims, 2 Drawing Sheets

SYSTEM AND METHOD FOR MIGRATING DATA FROM A STORAGE DEVICE

TECHNICAL FIELD

The present disclosure relates generally to data transfer and more particularly to a system and method for migrating data (e.g., system settings, application settings, etc.) from a storage device.

BACKGROUND

Traditionally, the ability to migrate data from a storage device has only encompassed migrating applications from a storage device. These traditional techniques, however, limit user productivity.

SUMMARY

According to one embodiment of the present disclosure, a method for migrating data from a storage device includes accessing data on a storage device. The method also includes providing at least one interface that allows for selecting a first operating system stored on the storage device. The interface further allows for selecting one or more settings stored on the storage device. The method further includes initiating a migration of the one or more settings from the storage device. The method further includes storing the one or more settings.

Particular embodiments of the present disclosure may allow for the migration of one or more settings stored on a storage device. As a result, an operating system can be executed on a new device with all the settings of the previous device. Accordingly, the operating system may appear to a user to be executed on the previous device, as opposed to the new device.

Particular embodiments of the present disclosure may further allow for the migrated settings to be transferred to a subsequent device. As a result, the settings may be applied to the operating system of any suitable device, even though the device was not involved in the original migration.

Particular embodiments of the present disclosure may further allow for migrated registry settings to be automatically applied to the registry on a new device. As a result, the device's registry may be more quickly set up for executing the device's operating system in accordance with the migrated registry settings.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

Figure 1:
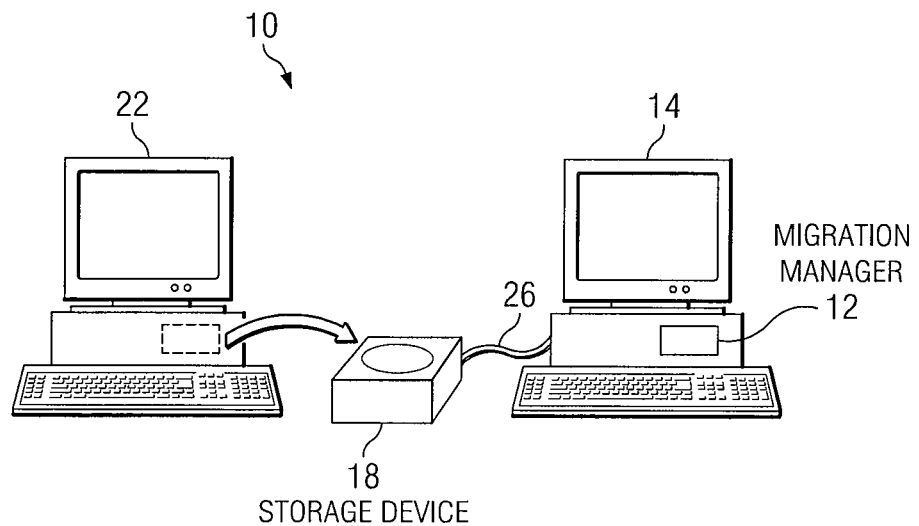
FIG. 1 is a block diagram illustrating one embodiment of a system for migrating data from a storage device.
Figure 2:
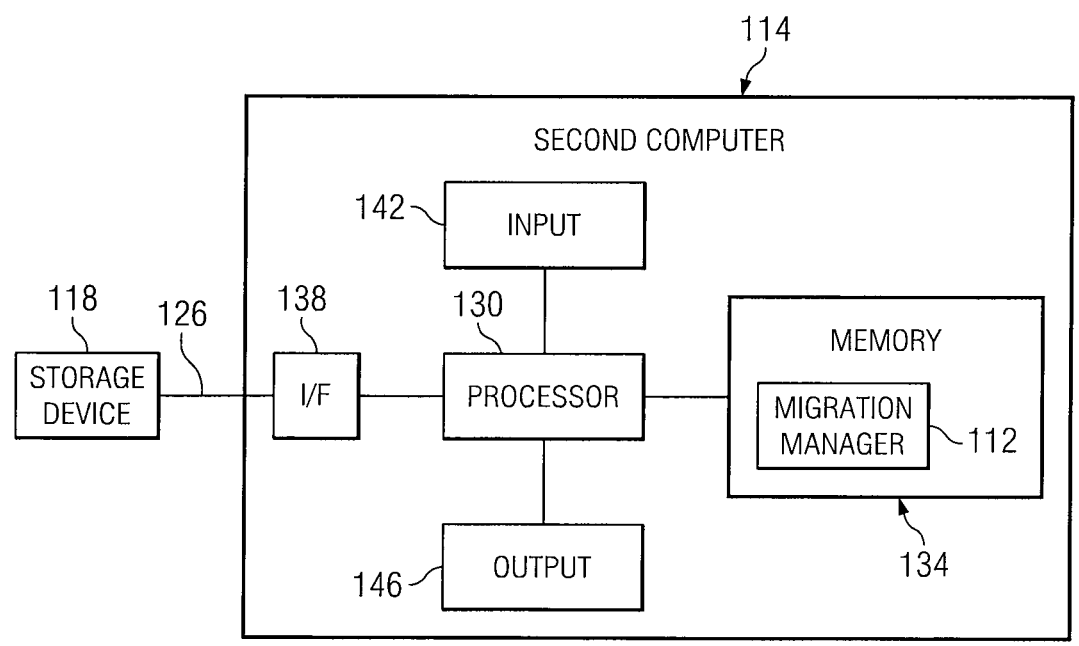
FIG. 2 is a block diagram illustrating one embodiment of a system for migrating data from a storage device.
Figure 3:
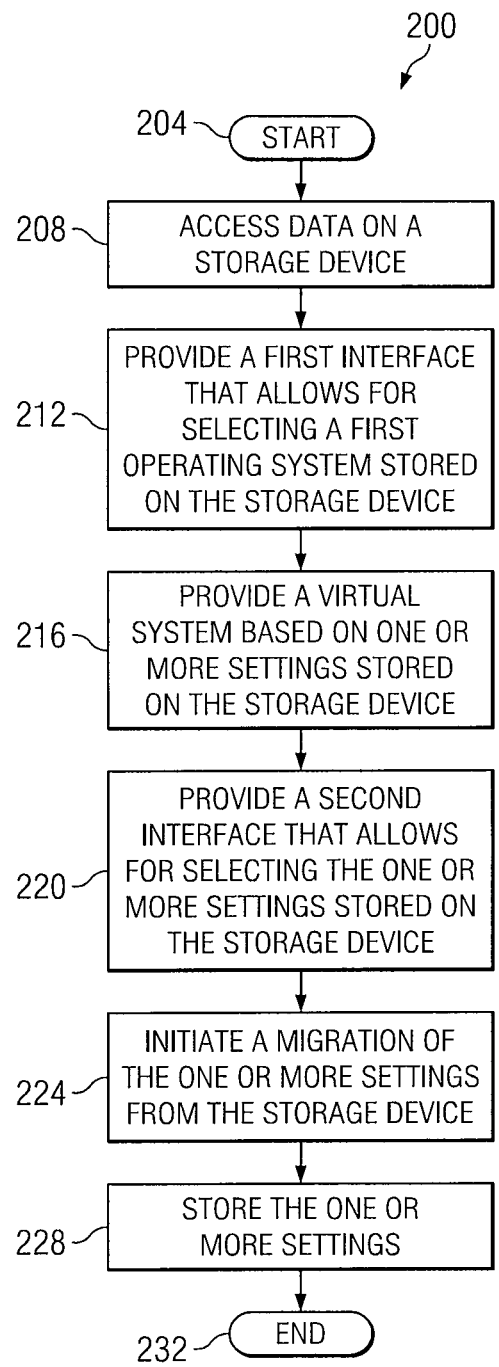
FIG. 3 illustrates one embodiment of a method for migrating data from a storage device.

Embodiments of the present disclosure and its advantages are best understood by referring to FIGS. 1 through 3 of the drawings, like numerals being used for like and corresponding parts of the various drawings.

FIG. 1 is a block diagram illustrating one embodiment of a system 10 for migrating data from a storage device. In one embodiment, system 10 includes a migration manager 12 that may initiate migration of data from a storage device 18. As a result of the migration, in one embodiment, a second computer 14 may receive the migrated data, allowing a user to access the data from a location different from that of storage device 18. Accordingly, when storage device 18 is unusable, the user may still have access to the data that was stored on storage device 18.

Data may refer to any type of information that may be stored on storage device 18. In one embodiment, data may further refer to any type of information that may be migrated from storage device 18 to second computer 14. According to one embodiment, data may refer to any type of information that may be used in a computer system. For example, data may refer to one or more operating systems, one or more applications, one or more settings associated with the operating systems (i.e., system settings), one or more settings associated with the applications (i.e., application settings), any other suitable settings, any suitable type of information associated with the operating systems and/or the applications, any user profile, any program of instructions, any file or folder, and/or any other suitable type of information. In one embodiment, data may refer to at least one or more settings. In such an embodiment, the settings may be migrated from storage device 18 to second computer 14 so that a user may execute an operating system with the same settings that were previously stored on storage device 18. Accordingly, the operating system of the second computer 14 may provide a user with substantially the same look and feel (i.e., including user profiles, user settings, background picture, saved files and folders, etc.) as the operating system stored on storage device 18. Accordingly, by migrating the data to second computer 14, the data may appear to a user of second computer 14 to have been accessed from (or executed by) first computer 22, as opposed to second computer 14.

According to the illustrated embodiment, system 10 includes migration manager 12, second computer 14, storage device 18, a first computer 22, and a connector 26. Migration manager 12 may be operable to initiate a migration of data from storage device 18. As a result of the migration, second computer 14 may receive the data migrated from storage device 18. In one embodiment, migration manager 12 may comprise any suitable hardware and/or software. For example, migration manager 12 may include software executed on a processor of second computer 14. As such, by executing migration manager 12, second computer 14 may cause migration manager 12 to initiate migration of data from storage device 18, allowing second computer 14 to receive the migrated data. Further embodiments of migration manager 12 are discussed below with regard to FIG. 2.

Second computer 14 may be operable to execute migration manager 12 so as to initiate migration of the data stored in storage device 18. Second computer 14 may be further operable to receive the migrated data. In one embodiment, second computer 14 may refer to any suitable device operable to process data. For example, second computer 14 may include a host computer, server, workstation, web server, file server, a personal computer such as a laptop, or any other device operable to process data. Further embodiments of second computer 14 are discussed below with regard to FIG. 2.

Storage device 18 may be operable to store data prior to the data being migrated to second computer 14. Storage device 18 may refer to any suitable device for storing data and instructions. For example, storage device 18 may include a magnetic disk, flash memory, optical disk, or other suitable data storage device. As another example, storage device 18 may refer to a hard drive. According to one embodiment, storage device 18 may store one or more operating systems and one or more settings. For example, storage device may store Windows New Technology (Windows NT), Windows 2000, Windows Experience (Windows XP), Windows Vista, or any other appropriate operating systems, including future operating systems. As another example, storage device 18 may store active directory settings, Internet Explorer settings, user account settings, desktop settings, system settings, application settings, and/or any other type of settings.

In one embodiment, storage device 18 may be associated with first computer 22, as opposed to second computer 14. For example, storage device 18 may be coupled to first computer 22, and not second computer 14. In such an example, storage device 18 may be physically attached to first computer 22, electrically attached to first computer 22, or both. In particular, storage device 18 may comprise an internal hard drive located inside of first computer 22. As another example, storage device 18 may store data and instructions for first computer 22, not second computer 14. As a further example, second computer 14 may not have access to the data and instructions stored on storage device 18 until storage device 18 is connected to second computer 14 using connector 26. In another embodiment, storage device 18 may be an external storage device that is initially only coupled to first computer 22.

First computer 22 may be similar to second computer 14. For example, first computer 22 may be operable to process data, and may include a host computer, workstation, web server, file server, a personal computer such as a laptop, or any other device operable to process data. In one embodiment, first computer 22 includes storage device 18 until storage device 18 is removed from first computer 22.

According to one embodiment, storage device 18 may be removed from first computer 22 in order to be connected to second computer 14. For example, first computer 22 may be opened up, and storage device 18 may be physically removed from first computer 22. In particular, in an embodiment where storage device 18 comprises an internal hard drive, first computer 22 may be physically opened up and storage device 18 may be completely detached (i.e., physically, electrically, etc.). According to one embodiment, storage device 18 may be removed from first computer 22 for any suitable reason. For example, an operating system stored on storage device 18 may crash, causing the operating system to fail to boot on first computer 22. As another example, data stored on storage device 18 may be needed in a location where first computer 22 would be unable to (or inconvenient to) move to.

According to one embodiment, after storage device 18 is removed from first computer 22, storage device 18 may be connected to second computer 14. For example, storage device 18 may be attached (i.e., physically, electrically, etc.) to second computer 14. In one embodiment, storage device 18 may be connected to second computer 14 using connector 26. Connector 26 may be operable to connect storage device 18 to second computer 14, and may be further operable to allow data to be migrated from storage device 18 to second computer 14. For example, connector 26 may comprise an advance technology attachment (ATA), advance technology attachment packet interface (ATAPI), parallel advance technology attachment (PATA), and/or any other suitable connector. In one embodiment, connector 26 may connect storage device 18 to second computer 14 as an internal storage device. As such, second computer 14 may identify and label storage device 18 as an internal hard drive.

According to one embodiment, by connecting storage device 18 to second computer 14 using connector 26, migration manager 12 may cause data, such as one or more settings, to be migrated over to second computer 14. Accordingly, second computer 14 may use the migrated data. Furthermore, a user may access the data at second computer 14 instead of at first computer 22 or storage device 18.

In a further embodiment, the migrated data may be accessed at second computer 14, but appear as if it was accessed from first computer 22. For example, the migrated data may be accessed at second computer 14 with all of the settings of the first computer 22. In particular, an application, such as Microsoft Word, that is stored on first computer 22 (i.e., using storage device 18) may be accessed by a user of second computer 14. Furthermore, when the application is accessed at second computer 14, it may have substantially the same appearance (i.e., font size, tool bar settings, paragraph format, etc.) as the application would have on first computer 22. As another example, even though second computer 14 may be executing a different operating system than that stored on storage device 18, the operating system of second computer 14 may be executed with the migrated data. As such, the operating system of second computer 14 may provide a user with substantially the same look and feel (i.e., including user profiles, user settings, background picture, saved files and folders, etc.) as the operating system stored on storage device 18. Accordingly, by migrating the data to second computer 14, the data may appear to a user of second computer 14 to have been accessed from (or executed by) first computer 22, as opposed to second computer 14.

Modifications, additions, or omissions may be made to system 10 without departing from the scope of the disclosure. The components of system 10 may be integrated or separated. Moreover, the operations of system 10 may be performed by more, fewer, or other components. For example, the operations of migration manager 12 may be performed by more than one component. As used in this document, (each) refers to each member of a set or each member of a subset of a set.

FIG. 2 is a block diagram illustrating one embodiment of a system 100 for migrating data from a storage device. According to the illustrated embodiment, system 100 includes a migration manager 112, a second computer 114, a storage device 118, and a connector 126. Migration manager 112 of FIG. 2 is similar to migration manager 12 of FIG. 1; second computer 114 of FIG. 2 is similar to second computer 14 of FIG. 1; storage device 118 of FIG. 2 is similar to storage device 18 of FIG. 1; and connector 126 of FIG. 2 is similar to connector 26 of FIG. 1.

As discussed above with regard to second computer 14 of FIG. 1, second computer 114 of FIG. 2 may refer to any suitable device operable to process data. According to the illustrated embodiment, second computer 114 includes a processor 130, a memory 134, a communication interface 138, an input device 142, an output device 146, and migration manager 112.

Processor 130 may refer to any suitable device operable to execute instructions and manipulate data to perform operations for second computer 114. Processor 130 may include, for example, any type of central processing unit (CPU). In one embodiment, processor 130 may execute migration manager 112 stored in memory 130. In a further embodiment, processor 130 may execute any suitable operating system. For example, second computer 114 may execute Windows New Technology (Windows NT), Windows 2000, Windows Experience (Windows XP), Windows Vista, or any other appropriate operating systems, including future operating systems.

Memory 134 may refer to any suitable device operable to store data and instructions. Memory 134 may include, for example, a magnetic disk, flash memory, optical disk, or other suitable data storage device. According to the illustrated embodiment, memory 134 may store migration manager 112 for execution by processor 130. In a further embodiment, memory 134 may be operable to store the data migrated from storage device 118 to second computer 114. In one embodiment, this data may be stored as a file, such as a DNA file.

Communication interface 138 may refer to any suitable device operable to receive input for second computer 114, send output from second computer 114, perform suitable processing of the input or output or both, communicate to other devices, or any combination of the preceding. Communication interface 138 may include appropriate hardware (e.g. modem, network interface card, etc.) and software, including protocol conversion and data processing capabilities, to communicate through a LAN, WAN, or other communication system that allows second computer 114 to communicate to other devices. Communication interface 138 may include any suitable software operable to access data from various devices such as storage device 118, input device 142, and/or any other suitable device. Communication interface 138 may also include any suitable software operable to transmit data to various devices such as storage device 118, input device 142, and/or any other suitable device. Communication interface 138 may include one or more ports, conversion software, or both.

Input device 142 may refer to any suitable device operable to input, select, and/or manipulate various data and information. Input device 142 may include, for example, a keyboard, mouse, graphics tablet, joystick, light pen, microphone, scanner, or other suitable input device. Output device 146 may refer to any suitable device operable for displaying information to a user. Output device 146 may include, for example, a video display, a printer, a plotter, or other suitable output device.

As discussed above with regard to migration manager 12 of FIG. 1, migration manager 112 of FIG. 2 may be operable to initiate a migration of data from storage device 118, allowing second computer 114 to receive the data migrated from storage device 118. In one embodiment, migration manager 112 may be operable to initiate the migration of all of the data stored on storage device 118. In a further embodiment, migration manager 112 may be operable to initiate the migration of only certain data stored on storage device 118. For example, migration manager 112 may only initiate the migration of certain data selected by a user of second computer 114.

In a further embodiment, migration manager 112 may be operable to identify one or more operating systems stored on storage device 118. For example, migration manager 112 may investigate the data stored on storage device 118, and may identify operating systems, such as Windows XP and Windows 2000, stored on storage device 118. According to one embodiment, migration manager 112 may identify the operating systems stored in storage device 118 in any suitable manner. For example, migration manager 112 may identify the operating systems stored in storage device 118 by interrogating the registry of storage device 118. As another example, migration manager 112 may identify the operating systems stored in storage device 118 by examining files and/or file structures stored in storage device 118. In a further embodiment, migration manager 112 may dynamically investigate and identify the operating systems. In another embodiment, migration manager 112 may investigate and identify the operating systems stored in storage device 118 after migration manager 112 receives access to the data on storage device 118 using connector 126.

In one embodiment, once migration manager 112 identifies the operating systems stored on storage device 118, migration manager 112 may provide an indication of these operating systems to a user of second computer 114. For example, migration manager 112 may provide a visual indication of these operating systems using output 146. As such, a user of second computer 114 may understand which operating systems are stored on storage device 118. In another embodiment, migration manager 112 may allow the user to select an operating system that is stored on storage device 118. For example, using input 142 of second computer 114, a user may select an operating system, such as Windows XP, stored on storage device 118. In one embodiment, migration manager 112 may only allow a user of second computer 114 to select an operating system having the same or an older edition of the operating system being executed on second computer 114. For example, if second computer 114 is executing Windows 2000 as an operating system, migration manager 112 may allow the user to select the operating system Windows 2000 from storage device 118, or may allow the user to select an older operating system, such as Windows NT. In such an example, however, migration manager 112 may not allow the user to select a newer operating system, such as Windows XP. In another embodiment, migration manager 112 may only allow a user of second computer 114 to select an operating system with settings that may be applied to an operating system being executed on second computer 114.

In a further embodiment, once a user has selected an operating system stored on storage device 118, migration manager 112 may be further operable to investigate and identify any other data stored on storage device 118. For example, migration manager 112 may investigate and identify various applications, such as Microsoft Office, Microsoft Word, Internet Explorer, or any other applications stored on storage device 118. As another example, migration manager 112 may further investigate any file, folder, and/or any other information stored on storage device 118.

As a further example, migration manager 112 may investigate and identify any settings stored on storage device 118. In one embodiment, settings stored on storage device 118 may refer to any information in the active directory settings, Internet Explorer settings, user account settings, desktop settings, system settings, application settings, and/or any other type of settings stored in storage device 118. System settings may, in one embodiment, include any setting of the selected operating system, such as the computer background displayed during the execution of an operating system. Application settings may, in one embodiment, include any setting for applications such as Microsoft Word, Microsoft Office, or any other application. In a further embodiment, settings stored on storage device 118 may refer to registry settings. As such, migration manager 112 may be operable to investigate and identify the stored registry settings, including any changes made to the registry.

In another embodiment, migration manager 112 may be further operable to create a virtual operating system. For example, after the user selects an operating system stored on storage device 118, migration manager 112 may use storage device 118 as a slave disk, providing the user of second computer 114 with a virtual image of the data stored on storage device 118. Accordingly, the data may appear to a user of second computer 114 to have been accessed from (or executed by) a device which storage device 118 was previously associated with (such as a previous computer), as opposed to second computer 114. In one embodiment, migration manager 112 may create the virtual operating system by loading data stored on storage device 118. In a further embodiment, the virtual operating system may allow migration manager 112 to investigate and identify the other data (e.g., settings, applications, files, etc.) stored on storage device 118. In an additional embodiment, the virtual operating system may allow migration manager 112 to initiate migration of the data to second computer 114. For example, the virtual operating system may allow migration manager 112 to collect the data (such as system settings, application settings, etc.) for migration using an application programming interface (API) on second computer 114.

According to one embodiment, once the data stored on storage device 118 has been investigated and identified, migration manager 112 may allow the user of second computer 114 to select the data for migration. For example, using input 142 of second computer 114, a user may select any data, such as settings associated with the selected operating system, for migration. In one embodiment, the user may select all of the data stored on storage device 118. In a further embodiment, the user may pick and choose which data they would like migrated to second computer 114. According to one embodiment, the user may select the data for migration after migration manager 112 has created the virtual operating system. In a further embodiment, the user may not select the operating system stored on storage device 118 for migration.

In one embodiment, after the user has selected the data (i.e., settings, applications, and/or any other data) to be migrated, migration manager 112 may be operable to initiate the migration of this data to second computer 114. In one embodiment, the migration of data from storage device 118 to second computer 114 may occur in any suitable manner. For example, the migration of data to second computer 114 may be a deferred migration. As such, migration manager 112 may save the data as a DNA file on second computer 114. In another embodiment, when the migrated data includes, for example, registry settings, migration manager 112 may automatically set up the migrated registry settings in a new registry on second computer 114, instead of saving it as a file.

In a further embodiment, when data is migrated from storage device 118 to second computer 114, all of the relationships for the data may be kept the same. For example, if a file was originally mapped to C:\\My_Pictures on storage device 118, the file may remain mapped to C:\\My_Pictures when migrated to second computer 114. Accordingly, in one embodiment, all of the file names and labels may be the same as they were on storage device 118.

In one embodiment, once the migrated data is stored on second computer 114 (i.e., as a DNA file), second computer 114 may use the migrated data. Furthermore, a user may access the data at second computer 114 instead of at storage device 118. In a further embodiment, the migrated data may be accessed at second computer 114, but appear as if it was accessed from storage device 118 (or the device previously associated with storage device 118). For example, a user of second computer 114 may execute the migrated application Microsoft Word, and the application may have substantially the same appearance (i.e., font size, tool bar settings, paragraph format, etc.) as the application would have on storage device 118 (or the device previously associated with storage device 118). In one embodiment, this may allow a seamless transition from the previous device to second computer 114.

As discussed above, once the migrated data is stored on second computer 114, for example, as a DNA file, the migrated data may be accessed on second computer 114. In a further embodiment, migration manager 112 may subsequently transfer the migrated data from second computer 114 to other systems. For example, when the data is saved as a DNA file, the DNA file may be transferred over a network, such as the internet, to a subsequent device, such as a third computer. Accordingly, the third computer may execute its operating system using the migrated data. As such, the migrated data may be accessed at the third computer, but appear as if it was accessed from storage device 118 (or the device previously associated with storage device 118). As a further example, the migrated data may be saved to any data storage device (i.e., a CD ROM, external hard drive, etc.), or be transferred to and/or stored at any other suitable device using any other suitable manner. Accordingly, in one embodiment, access to the migrated data may not be limited to second computer 114, but may occur at any other suitable device.

Modifications, additions, or omissions may be made to system 100 without departing from the scope of the disclosure. The components of system 100 may be integrated or separated. Moreover, the operations of system 100 may be performed by more, fewer, or other components. For example, the operations of migration manager 112 may be performed by more than one component.

FIG. 3 illustrates one embodiment of a method 200 for migrating data from a storage device. In one embodiment, the steps of method 200 may be performed by a migration manager. In a further embodiment, the steps of method 200 may be performed by any other suitable device, including more than one device. The method begins at step 204. At step 208, the data on a storage device is accessed. According to one embodiment, data may refer to any type of information that may be used in a computer system. In one embodiment, the data may be accessed after the storage device is removed from a first computer and the storage device is connected to a second computer using a connector. In a further embodiment, the storage device may be connected to the second computer as an internal storage device. In one embodiment, by accessing data on the storage device, one or more operating systems stored on the storage device may be investigated and identified.

At step 212, a first interface is provided to allow for selecting a first operating system stored on the storage device. In one embodiment, the first interface may allow a user of a second computer to select the desired first operating system. In a further embodiment, the first operating system may only be selected if the first operating system is the same or an older edition of the operating system being executed on the second computer.

At step 216, a virtual system based on one or more settings stored on the storage device is provided. In one embodiment, the virtual system may provide the user of the second computer with a virtual image of the data stored on the storage device. Accordingly, the data may appear to a user of the second computer to have been accessed from (or executed by) the first computer, as opposed to the second computer.

At step 220, a second interface is provided for selecting the one or more settings stored on the storage device. In one embodiment, the second interface may allow system settings or application settings to be selected for migration. In a further embodiment, the second interface may further allow any other suitable data stored on the storage device to be selected for migration. For example, the second interface may allow user profiles, applications, files, and/or folders to be selected for migration. In a further embodiment, the first interface and the second interface may be the same interface. As such, one interface may allow for selecting a first operating system and for selecting one or more settings.

At step 224, a migration of the one or more settings from the storage device is initiated. In one embodiment, this initiation may cause the one or more settings to be transferred to the second computer. In a further embodiment, the initiation may allow any other selected data to be transferred to the second computer. According to one embodiment, the data may migrated from the storage device to the second computer over the connector.

At step 228, the one or more settings are stored. In one embodiment, the one or more settings are stored on the second computer. In a further embodiment, the one or more settings are saved as a DNA file on the second computer. In one embodiment, storing the one or more settings may allow the second computer to operate the operating system on the second computer so that it has substantially the same look and feel (i.e., including user profiles, user settings, background picture, saved files and folders, etc.) as the operating system stored on the storage device. Accordingly, any accessed data may appear to a user of the second computer to have been accessed from (or executed by) the first computer, as opposed to the second computer. As such, there may be a seamless transition from the first computer to the second computer. In a further embodiment, any migrated registry settings may be automatically saved to a registry on the second computer. In another embodiment, any other data selected for migration and received at the second computer may be stored.

In one embodiment, any of the migrated data (including the one or more settings) may be subsequently stored at or transferred to any other suitable device. For example, the one or more settings may be transferred over a network to a third computer. Accordingly, the third computer may execute its operating system using the migrated data. As such, the migrated data may be accessed at the third computer, but appear as if it was accessed from the first computer. At step 232, the method ends.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. A method for migrating data from a storage device, comprising:
   accessing data on a storage device associated with a first computer;
   providing at least one user interface at a second computer that allows for selecting a particular one of one or more operating systems stored on the storage device, wherein the at least one user interface further allows for selecting one or more settings stored on the storage device;
   providing a virtual system at the second computer based on the one or more selected settings;
   initiating a migration of the one or more selected settings from the storage device to the second computer; and
   storing the one or more settings on the second computer.

2. The method of claim 1, further comprising transmitting the one or more settings to a third computer, wherein the third computer is operable to execute a third operating system according to the one or more settings.

3. The method of claim 1, wherein the at least one user interface further allows for selecting one or more applications stored on the storage device, and wherein the method of claim 1 further comprises:
   initiating a migration of the selected one or more applications from the storage device; and
   storing the one or more selected applications.

4. The method of claim 1, wherein the second computer is operable to execute a second operating system, and wherein the selected operating system is the same or an older edition of the second operating system.

5. The method of claim 1, further comprising removing the storage device from the first computer prior to the accessing data on the storage device.

6. The method of claim 1, further comprising coupling the storage device to the second computer using a Parallel Advanced Technology Attachment prior to the accessing data on the storage device.

7. The method of claim 1, wherein the second computer is operable to execute a second operating system according to the one or more settings.

8. The method of claim 1, further comprising:
   identifying the one or more operating systems on the first computer; and
   identifying the one or more settings on the first computer.

9. The method of claim 1, wherein the at least one user interface comprises:
   a first user interface that allows for the selecting the first particular one of the one or more operating systems stored on the storage device; and
   a second user interface that allows for the selecting the one or more settings stored on the storage device.

10. A system for migrating data from a storage device, comprising:
    a processor; and
    a program of instructions embodied on a computer-readable medium and operable, upon execution by the processor, to:
       access data on a storage device associated with a first computer;
       provide at least one user interface at a second computer that allows for selecting a particular one of one or more operating systems stored on the storage device, wherein the at least one user interface further allows for selecting one or more settings stored on the storage device;
       provide a virtual system at the second computer based on the one or more selected settings;
       initiate a migration of the one or more selected settings from the storage device to the second computer; and
       store the one or more settings on the second computer.

11. The system of claim 10, wherein the program of instructions is further operable, upon execution by the processor, to transmit the one or more selected settings to a third computer, wherein the third computer is operable to execute a third operating system according to the one or more selected settings.

12. The system of claim 10, wherein the at least one user interface further allows for selecting one or more applications stored on the storage device, and wherein the program of instructions is further operable, upon execution by the processor, to:
    initiate a migration of the one or more applications from the storage device; and
    store the one or more applications.

13. The system of claim 10, wherein the second computer is operable to execute a second operating system, and wherein the selected operating system is the same or an older edition of the second operating system.

14. The system of claim 10, wherein the storage device is removed from the first computer prior to the accessing data on the storage device.

15. The system of claim 10, wherein the storage device is coupled to the second computer using a Parallel Advanced Technology Attachment prior to the accessing data on the storage device.

16. The system of claim 10, wherein the second computer is operable to execute a second operating system according to the one or more settings.

17. The system of claim 10, wherein the program of instructions is further operable, upon execution by the processor, to:
   identify the one or more operating systems on the first computer; and
   identify the one or more settings on the first computer.

18. The system of claim 10, wherein the at least one user interface comprises:
   a first user interface that allows for the selecting the first operating system stored on the storage device; and
   a second user interface that allows for the selecting the one or more settings stored on the storage device.

19. A method for migrating data from a storage device, comprising:
   accessing data on a storage device associated with a first computer;
   coupling the storage device to a second computer prior to the accessing data on the storage device;
   identifying a one or more operating systems stored on the storage device;
   identifying one or more settings stored on the storage device;
   providing at least one user interface at the second computer that allows for selecting a particular one of one or more operating systems stored on the storage device, wherein the at least one user interface further allows for selecting the one or more settings stored on the storage device, wherein the at least one user interface further allows for selecting one or more applications stored on the storage device, wherein the at least one user interface comprises:
      a first user interface that allows for the selecting the first operating system stored on the storage device; and
      a second user interface that allows for the selecting the one or more settings stored on the storage device;
   providing a virtual system at the second computer based on the one or more settings;
   initiating a migration of the one or more settings from the storage device to the second computer;
   initiating a migration of the one or more applications from the storage device to the second computer;
   storing the one or more settings on the second computer, wherein the storing the one or more settings comprises storing the one or more settings on the second computer, wherein the second computer is operable to execute a second operating system according to the one or more settings, wherein the first operating system is the same or an older edition of the second operating system;
   storing the one or more applications on the second computer;
   transmitting the one or more settings to a third computer, wherein the third computer is operable to execute a third operating system according to the one or more settings.

20. A method for migrating data from a storage device, comprising:
   accessing data on a storage device associated with a first computer, the data comprising one or more operating systems, one or more applications, and one or more settings;
   providing at least one user interface at a second computer that allows a user to select a particular one of one or more operating systems stored on the storage device, wherein the at least one user interface further allows a user to select particular ones of the one or more applications and particular ones of the one or more settings stored on the storage device;
   providing a virtual system at the second computer based on the selected applications and the selected settings;
   initiating a migration of the selected applications and the selected settings from the storage device to the second computer; and
   storing the selected applications and the selected settings on the second computer.

21. A method for migrating data from a first computer to a second computer, comprising:
   accessing, using a second computer, data stored on a first storage device previously coupled to a first computer, the data comprising one or more operating systems, one or more settings associated with the one or more operating systems, one or more applications, and one or more settings associated with the one or more applications;
   identifying, using the second computer, the one or more operating systems, one or more settings associated with the one or more operating systems, one or more applications, and one or more settings associated with the one or more applications stored on the first storage device;
   providing, at the second computer, a user with an option of selecting a particular one of the one or more operating systems stored on the first storage device;
   providing, at the second computer, the user with an option of selecting particular ones of the one or more settings associated with the selected operating system, particular ones of the one or more applications, and particular ones of the one or more settings associated with the selected one or more applications stored on the first storage device;
   providing a virtual system at the second computer based on the selected operating system, the selected applications, and the selected settings;
   initiating the migration of the selected operating system, the selected one or more settings associated with the selected operating system, the selected one or more applications, and the selected one or more settings associated with the selected one or more applications from the first storage device to a second storage device coupled to the second computer;
   storing the selected operating system, the selected one or more settings associated with the selected operating system, the selected one or more applications, and the selected one or more settings associated with the selected one or more applications on the second storage device coupled to the second computer.

* * * * *